(12) United States Patent
Miya

(10) Patent No.: US 10,546,152 B2
(45) Date of Patent: Jan. 28, 2020

(54) MEMBER INFORMATION MANAGEMENT SYSTEM AND MEMBER INFORMATION MANAGEMENT PROGRAM

(71) Applicant: Infoscience Corporation, Tokyo (JP)

(72) Inventor: Norio Miya, Tokyo (JP)

(73) Assignee: Infoscience Corporation, Tokyo (JP)

( * ) Notice: Subject to any disclaimer, the term of this patent is extended or adjusted under 35 U.S.C. 154(b) by 222 days.

(21) Appl. No.: 15/549,758

(22) PCT Filed: Feb. 9, 2016

(86) PCT No.: PCT/JP2016/000669
§ 371 (c)(1),
(2) Date: Aug. 9, 2017

(87) PCT Pub. No.: WO2016/136167
PCT Pub. Date: Sep. 1, 2016

(65) Prior Publication Data
US 2018/0025176 A1     Jan. 25, 2018

(30) Foreign Application Priority Data
Feb. 27, 2015    (JP) ................................ 2015-039621

(51) Int. Cl.
     *G06F 21/62*      (2013.01)
     *G06F 21/31*      (2013.01)
     (Continued)

(52) U.S. Cl.
CPC .......... *G06F 21/6245* (2013.01); *G06F 21/31* (2013.01); *G06Q 10/025* (2013.01); *G06Q 50/01* (2013.01)

(58) Field of Classification Search
None
See application file for complete search history.

(56) References Cited

U.S. PATENT DOCUMENTS

| 8,555,403 B1 * | 10/2013 | Kilday | ................... G06F 21/62 709/229 |
| 8,719,903 B1 * | 5/2014 | Kilday | ................... G06F 21/62 726/4 |

(Continued)

FOREIGN PATENT DOCUMENTS

| JP | 2001-290768 A | 10/2001 |
| JP | 2002-222305 A | 8/2002 |

(Continued)

OTHER PUBLICATIONS

International Search Report dated Apr. 19, 2016, issued in counterpart International Application No. PCT/JP2016/000669 (2 pages).

*Primary Examiner* — Malcolm Cribbs
(74) *Attorney, Agent, or Firm* — Westerman, Hattori, Daniels & Adrian, LLP

(57) ABSTRACT

A member information management system stores data of second stage groups H and I and second stage groups J and K and data of members belonging to these second stage groups in a data protection area corresponding to each of a plurality of first stage groups A and B. The data of the second stage groups H, I, J, and K includes presentation data of a registration form of the second stage group and contents data for the second stage group. The member data includes specific data for specifying the second stage group H, I, J, or K. When a login operation of an administrator is successfully authenticated by administrator authentication information stored in an administrator protection area corresponding to the first stage groups A and B, browsing of predetermined data in all protection areas of the plurality of first stage groups A and B is permitted.

19 Claims, 20 Drawing Sheets

(51) Int. Cl.
*G06Q 10/02* (2012.01)
*G06Q 50/00* (2012.01)

(56) References Cited

U.S. PATENT DOCUMENTS

| | | | |
|---|---|---|---|
| 10,182,024 B1* | 1/2019 | Chung | H04L 51/04 |
| 2002/0103859 A1 | 8/2002 | Kataoka et al. | |
| 2008/0154903 A1* | 6/2008 | Crowley | H04L 63/104 |
| 2010/0235588 A1* | 9/2010 | Maeda | H04L 9/085 |
| | | | 711/147 |
| 2010/0333131 A1* | 12/2010 | Parker | H04N 7/1675 |
| | | | 725/31 |
| 2012/0166544 A1* | 6/2012 | Wilder | G06Q 10/109 |
| | | | 709/204 |
| 2012/0303644 A1* | 11/2012 | Martin, Jr. | G06Q 30/02 |
| | | | 707/756 |
| 2012/0311039 A1* | 12/2012 | Ogawa | G06Q 10/00 |
| | | | 709/204 |
| 2012/0331568 A1* | 12/2012 | Weinstein | H04L 12/185 |
| | | | 726/29 |
| 2013/0090980 A1 | 4/2013 | Hummel | |
| 2013/0091213 A1* | 4/2013 | Diab | G06Q 50/01 |
| | | | 709/204 |
| 2013/0159087 A1 | 6/2013 | Boyd et al. | |
| 2014/0173467 A1* | 6/2014 | Clavel | H04L 12/1822 |
| | | | 715/758 |
| 2014/0244943 A1* | 8/2014 | Jacobs | G06F 12/0815 |
| | | | 711/141 |
| 2014/0267567 A1* | 9/2014 | Mihara | H04L 65/403 |
| | | | 348/14.08 |
| 2015/0039761 A1* | 2/2015 | Patil | G06Q 10/10 |
| | | | 709/225 |
| 2015/0057945 A1* | 2/2015 | White | A61B 5/0022 |
| | | | 702/19 |
| 2015/0143485 A1 | 5/2015 | Tamura | |
| 2016/0352526 A1* | 12/2016 | Adler | H04L 67/1095 |

FOREIGN PATENT DOCUMENTS

| | | |
|---|---|---|
| JP | 2003-196553 A | 7/2003 |
| JP | 2004-178433 A | 6/2004 |
| JP | 2007-219677 A | 8/2007 |
| JP | 2011-180938 A | 9/2011 |
| JP | 2012-160104 A | 8/2012 |
| JP | 2013-80444 A | 5/2013 |
| WO | 2008/025035 A2 | 2/2008 |
| WO | 2013/179383 A1 | 12/2013 |

* cited by examiner

Fig. 5(a)

| Name of first stage group (Name of tenant) | First stage group ID (TenantID) | Operating user administration account | Operating user password |
|---|---|---|---|
| English study group | 《A》 | admin-A | xxaxxx |

Fig. 5(b)

| Name of first stage group (Name of tenant) | First stage group ID (TenantID) | Operating user administration account | Operating user password |
|---|---|---|---|
| Web service study group | 《B》 | admin-B | xxbxxx |

Fig. 6(a)

| Name of second stage group (Name of membership) | Second stage group ID (Membership ID) | First stage group ID (Tenant ID) | Registration form ID | Contents ID |
|---|---|---|---|---|
| Silver | 《h》 | 《A》 | f1 | h-c |

Fig. 6(b)

| Name of second stage group (Name of membership) | Second stage group ID (Membership ID) | First stage group ID (Tenant ID) | Registration form ID | Contents ID |
|---|---|---|---|---|
| Gold | 《i》 | 《A》 | f2 | i-c |

Fig. 6(c)

| Name of second stage group (Name of membership) | Second stage group ID (Membership ID) | First stage group ID (Tenant ID) | Registration form ID | Contents ID |
|---|---|---|---|---|
| Standard | 《j》 | 《B》 | f3 | j-c |

Fig. 6(d)

| Name of second stage group (Name of membership) | Second stage group ID (Membership ID) | First stage group ID (Tenant ID) | Registration form ID | Contents ID |
|---|---|---|---|---|
| Premium | 《k》 | 《B》 | f4 | k-c |

Fig. 7(a)

| Registratiuon form ID | First stage group ID | Information string number acquired | Order displayed on the registration form display screen |
|---|---|---|---|
| f1 | 《A》 | Information 1 | 1 |
| f1 | 《A》 | Information 2 | 3 |
| f1 | 《A》 | Information 3 | 2 |
| f2 | 《A》 | Information 1 | 1 |
| f2 | 《A》 | Information 2 | 2 |
| f2 | 《A》 | Information 3 | 3 |
| f2 | 《A》 | Information 4 | 4 |

Fig. 7(b)

| Registratiuon form ID | First stage group ID | Information string number acquired | Order displayed on the registration form display screen |
|---|---|---|---|
| f3 | 《B》 | Information 1 | 1 |
| f3 | 《B》 | Information 2 | 2 |
| f3 | 《B》 | Information 4 | 3 |
| f3 | 《B》 | Information 5 | 4 |
| f4 | 《B》 | Information 1 | 1 |
| f4 | 《B》 | Information 2 | 2 |
| f4 | 《B》 | Information 3 | 3 |
| f4 | 《B》 | Information 4 | 4 |
| f4 | 《B》 | Information 5 | 5 |

Fig. 8(a)

| Member name | Member ID | Email address | First stage group ID (Tenant ID) | Second stage group ID (Membership ID) |
|---|---|---|---|---|
| taro | X | taro@test.jp | «A» | «h» |
| taro | X | taro@test.jp | «A» | «i» |
| jiro | Y | jiro@test.com | «A» | «j» |

Fig. 8(b)

| Member name | Member ID | Email address | First stage group ID (Tenant ID) | Second stage group ID (Membership ID) |
|---|---|---|---|---|
| jiro | Y | jiro@test.com | «B» | «j» |
| sabu | Z | sabu@test.com | «B» | «k» |

Fig. 9(a)

| First stage group ID (Tenant ID) | Information string number | Contents of information string |
|---|---|---|
| 《A》 | Information 1 | Address |
| 《A》 | Information 2 | Name |
| 《A》 | Information 3 | Email address |
| 《A》 | Information 4 | Telephone number |

Fig. 9(b)

| First stage group ID (Tenant ID) | Information string number | Contents of information string |
|---|---|---|
| 《B》 | Information 1 | Address |
| 《B》 | Information 2 | Name |
| 《B》 | Information 3 | Position |
| 《B》 | Information 4 | Telephone number |
| 《B》 | Information 5 | Email address |

Fig. 10(a)

| Member ID | First stage group ID | Information string number | Contents of information string |
|---|---|---|---|
| X | 《A》 | Information 1 | Tokyo |
| X | 《A》 | Information 2 | Taro YAMADA |
| X | 《A》 | Information 3 | taro@test.jp |
| Y | 《A》 | Information 1 | Tokyo |
| Y | 《A》 | Inforamtion 2 | Jiro SUZUKI |
| Y | 《A》 | Information 3 | jiro@test.com |
| Y | 《A》 | Information 4 | 090-2222-2222 |

Fig. 10(b)

| Member ID | First stage group ID | Information string number | Contents of information string |
|---|---|---|---|
| Y | 《B》 | Information 1 | Tokyo |
| Y | 《B》 | Inforamtion 2 | Jiro SUZUKI |
| Y | 《B》 | Information 3 | Section manager |
| Y | 《B》 | Information 4 | 090-2222-2222 |
| Y | 《B》 | Information 5 | jiro@test.com |
| Z | 《B》 | Information 1 | Kanagawa |
| Z | 《B》 | Inforamtion 2 | Saburo SATO |
| Z | 《B》 | Information 3 | General manager |
| Z | 《B》 | Information 4 | 090-3333-3333 |
| Z | 《B》 | Information 5 | saburo@test.com |

Fig. 16

| First stage group ID (Tenant ID) | Operating user password | Name | Address | Email Address | Telephone number | Service contents ID |
|---|---|---|---|---|---|---|
| 《A》 | xxxAxxx | Saburo KATO | Kanagawa | saburo@test.jp | 090-6666-1111 | ss-c |
| 《B》 | xxxBxxx | Goro FUJITA | Chiba | goro@test.com | 090-7777-2222 | ss-c |

Fig. 21

| Member name | Member ID | Email Address | First stage group ID | Second stage group ID | Target ID | | |
|---|---|---|---|---|---|---|---|
| taro | X | taro@test.jp | 《A》 | 《h》 | xxx01 | ... | |
| taro | X | taro@test.jp | 《A》 | 《i》 | xxx01 | ... | |
| jiro | Y | jiro@test.com | 《A》 | 《i》 | xxx02 | ... | xxx36 |

…

MEMBER INFORMATION MANAGEMENT SYSTEM AND MEMBER INFORMATION MANAGEMENT PROGRAM

TECHNICAL FIELD

The present invention relates to a member information management system and a member information management program for managing information on members and groups when a group is formed by a plurality of members.

BACKGROUND ART

A member information management system disclosed in Patent Literatures 1 and 2 is known as an Information management system for managing information on members and groups when a group is formed by a plurality of members. In the member information management system of Patent Literature 1, a member information management server having a member information database in which personal information of members is registered registers formation information of a new group of which an administrator is a member who sends request information according to the request information so that the other member can browse the formation information by the other client terminal, receives group participation application information from the other member who has browsed the group formation information, registers information indicating that the other member who has applied for group participation has become a member of the group in the member information database, and registers opening notice information of an event for members of a group in a state in which the opening notice can be browsed by only those who are group members and registers attendance/absence communication information for informing whether members will attend the event or not. This system enables members registered in the member information database to freely create a group and enables members belonging to a group themselves to communicate with other members and manage member information.

In the member in management system of Patent Literature 2, a management server system having a web server that operates a shopping site receives a request for registering a plurality of applicants as one group, registers the plurality of applicants as one group on the basis of the request, registers one of members belonging to a group as an administrator who has the authority to add or remove a member belonging to the group, evaluates a behavior such as the record of a product purchase of each member belonging to the group as a behavior of the group, and notifies each member belonging to the group of the benefit corresponding to the evaluation. This system enables a group configuration to be determined relatively freely according to a statement of an applicant who wants to be registered in the group so that members belonging to the group gain a higher score.

CITATION LIST

Patent Literature

[PTL 1] Japanese Patent Application Publication No. 2007-219677
[PTL 2] Japanese Patent Application Publication No. 2003-196553

SUMMARY OF INVENTION

Technical Problem

However, in the member information management system of Patent Literatures 1 and 2, although groups on the same layer are registered in an entire operation system, when a plurality of operation systems is operated, the respective operation systems are operated independently. Due to this, it is difficult for an operating user of the individual independent operation system to receive a service such as an advice or information related to operation and management of the system from the outside.

Moreover, in an Internet shop or the like, there are many requests to set groups of the same layers in an entire operation system and to carry out a business. In order to cope with such many requests, a platform capable of setting entire groups having groups on the same layer as higher-level groups and managing a plurality of higher-level groups in an integrated manner is required.

The present invention is proposed in view of the above-described problems, and object thereof is to provide a member information management system and a member information management program capable of allowing an operating user who sets groups on the same layer in an operation system and operates a business or the like to receive a service such as an advice or provision of information from the outside and allowing a person who wants to use the operation system that sets groups on the same layer in the entire system to use the operation system easily.

Solution to Problem

A member information management system according to the present invention is configured to: store data of a plurality of first stage groups that provide services having similarity; store data of a plurality of settable second stage groups belonging to the first stage group in a protection area corresponding to each of the first groups, the data of each of the second stage groups including presentation data of a registration form for the second stage group and presentation data of contents for the second stage group; store data of a member belonging to the first stage group and belonging to the second stage group in the first stage group, registered from the registration form in a protection area corresponding to each of the first stage groups, the data of the member including specific data for specifying the second stage group to which the member belongs and unique information of the member; store administrator authentication information in an administrator protection area other than the protection areas corresponding to the first stage groups; and permit all of the plurality of first stage groups to browse predetermined data in the protection area corresponding to the first stage group when a login operation of an administrator is successfully authenticated by the administrator authentication information.

According to this member information management system, an operating user can set second stage groups on the same layer in an operation system corresponding to a first stage group and operate a business or the like. Furthermore, an administrator of the entire plurality of first stage groups that provide services having similarity can browse predetermined data of respective first stage groups while protecting the data of the individual first stage groups operated by the operating users. In this way, the administrator can provide an advice, information and the like to the operating user using the respective pieces of predetermined data as resources. That is, the operating user who sets the second stage groups on the same layer in the operation system corresponding to the first stage group and operate a business or the like can receive a service such as an advice or provision of information from the outside. Moreover, by providing a platform that manages the entire plurality of first stage groups in an integrated manner, many applicants can easily operate the operation system corresponding to the first stage group. A person who wants to use the operation system that sets groups on the same layer in the entire system can easily use the operation system. Moreover, the member information management device can be used by an arbitrary business operator of various business types regardless of a business category as long as an operating user can set second stage groups on the same layer in an operation system corresponding to a first stage group and operate a business. Therefore, the member information management device provides excellent versatility and flexibility.

In the member information management system of the present invention, the same member may be registered to belong to a plurality of second stage groups belonging to the same first stage group, and the same member may be registered to belong to the second stage groups of different first stage groups among the plurality of first stage groups.

According to this member information management system, members can belong to different stage groups in an operation system corresponding to an arbitrary first state group and can participate in an operation system corresponding to another first stage group. Therefore, it is possible to enhance the convenience of members.

In the member information management system of the present invention, the data of the member may have a member ID, member authentication information corresponding to the member ID may be stored in a member authentication protection area other than the protection area corresponding to the first stage group and the administrator protection area, and when the member authentication information was successfully authenticated in a to operation of the member, the member may be permitted to browse the contents for the second stage group to which the member having the member ID belongs.

According to this member information management system, even when the information on registered members is spilled from an operation system corresponding to an arbitrary first stage group operated by an operating user, it is possible to prevent leakage of the member authentication information and to improve the security of the operating user and the members.

In the member information management system of the present invention, the same member ID and the same member authentication information for permitting to browse the contents for the second stage groups in the different first stage groups are stored in the member authentication protection area with respect to the same member registered to belong to the second stage groups in different first stage groups of the entire plurality of first stage groups.

According to this member information management system, member authentication information for the same member is protected and managed independently from the plurality of first stage groups. Even when the information on registered members is spilled from an operation system corresponding to an arbitrary first stage group operated by an operating user, it is possible to prevent leakage of member authentication information and to improve the security of the operating user and the members. Moreover, it is possible to lessen the labor associated with self-safety control of the authentication information, of members participating in a plurality of operation systems corresponding to a plurality of first stage groups.

In the member information may system of the present invention, the same member may be registered to belong to second stage groups different from one second stage group belonging to the same first stage group, and when a member who has registered to the one second stage group additionally registers to the different second stage groups, necessary data of the member stored in advance may be presented to the other second stage groups in a state of being reflected in necessary input items of the registration form.

According to this member information management system, it is possible to lessen the member's labor when a member who has already registered to one second stage group belonging to a first stage group additionally registers to another second stage group belonging to the same first stage group.

In the member information management system of the present invention, the same member may be registered to belong to the second stage group different from one second stage group belonging to the same first stage group, in response to a request by a member having registered to the one second stage group to additionally register to the different second stage group, the specific data for specifying the different second stage group may be additionally stored in correlation with the necessary data of the member stored in advance, and in response to a request by a member having registered to the one second stage group to change the registration so as to be registered to the different second stage group, the specific data for specifying the one second stage group stored in correlation with the necessary data of the member stored in advance may be changed to the specific data for specifying the other second stage group and be stored in correlation.

According to this member information management system, member who has registered to one second stage group belonging to a first stage group can additionally register to another second stage group belonging to the same first stage group or can change the registration so as to be registered to another second stage group belonging to the same first stage group. Therefore, a group to which the member belongs can be flexibly added or changed with little labor.

In the member information management system of the present invention, data of a service group may be stored in the same layer as the plurality of first stage groups, and the data of the service group may include unique information of an operating user who operates each of the plurality of first stage groups and presentation data of service contents provided in common to the operating users.

According to this member information management system, it is possible to efficiently provide a service based on service contents such as an advice or provision of information using the data structure of the first stage group without using additional system resources. Moreover, since management of the same kind as the management of the first stage group can be used for management the service group, it is possible to lessen the labor associated with management of the service group.

A member information management program according to the present invention is configured to cause a computer to function as means for: storing data of a plurality of first stage groups that provide services having similarity; storing data of a plurality of settable second stage groups belonging to the first stage group in a protection area corresponding to each of the first stage groups, the data of each of the second stage groups including presentation data of a registration form for the second stage group and presentation data of contents for the second stage group; storing data of a member belonging to the first stage group and belonging to the second stage group in the first stage group, registered from the registration form in a protection area corresponding to each of the first stage groups, the data of the member including specific data for specifying the second stage group to which the member belongs and unique information of the member; storing administrator authentication information in an administrator protection area other than the protection areas corresponding to the first stage groups; and permitting all of the plurality of first stage groups to browse predetermined data in the protection area corresponding to the first stage group when a login operation of an administrator is successfully authenticated by the administrator authentication information.

According to this member information management program, an operating user can set second stage groups on the same layer in an operation system corresponding to a first stage group and operate a business or the like. Furthermore, an administrator of the entire plurality of first stage groups that provide services having similarity can browse predetermined data of respective first stage groups while protecting the data of the individual first stage groups operated by the operating users. In this way, the administrator can provide an advice, information, and the like to the operating user using the respective pieces of predetermined data as resources. That is, the operating user who sets the second stage groups on the same layer in the operation system corresponding to the first stage group and operates a business or the like can receive a service such as an advice or provision of information from the outside. Moreover, by providing a platform that manage the entire plurality of first stage groups in an integrated manner, many applicants can easily operate the operation system corresponding to the first stage group. A person who wants to use the operation system that sets groups on the same layer in the entire system can easily use the operation system. Moreover, the member information management device can be used by an arbitrary business operator of various business types regardless of a business category as long as an operating user can set second stage groups on the same layer in an operation system corresponding to a first stage group and operate a business. Therefore, the member information management device provides excellent versatility and flexibility.

Advantageous Effects of Invention

According to the present invention, it is possible to allow an operating user who sets groups on the same layer in an operation system and operates a business or the like to receive a service such as an advice or provision of information from the outside and to allow a person who wants to use the operation system that sets groups on the same layer in the entire system to use the operation system easily.

BRIEF DESCRIPTION OF DRAWINGS

FIGS. 5(a) and 5(b) are diagrams illustrating a storage table of a first stage group unique data storage unit in a use example of the member information management system according to the embodiment.

FIGS. 6(a) to 6(d) are diagrams illustrating a storage table of a second stage group data storage unit in a use example of the member information management system according to the embodiment.

FIGS. 7(a) and 7(b) are diagrams illustrating a registration form-information string number table of a first stage group data storage unit in a use example of the member information management system according to the embodiment.

FIGS. 8(a) and 8(b) are diagrams illustrating a member table of a member data storage unit in a use example of the member information management system according to the embodiment.

FIGS. 9(a) and 9(b) are diagrams illustrating a member information definition table of a member data storage unit in a use example of the member information management system according to the embodiment.

FIGS. 10(a) and 10(b) are diagrams illustrating a member information table of a member data storage unit in a use example of the member information management system according to the embodiment.

FIG. 16 is a diagram illustrating a storage table of a service group data storage unit in a use example of the member information management system according to the embodiment.

FIG. 21 is a diagram rating an example of a member table of a member data storage unit to which a target ID is set in correlation.

DESCRIPTION OF EMBODIMENTS

[Member Information Management System and Member Information Management Program According to Embodiment]

Figure 1:
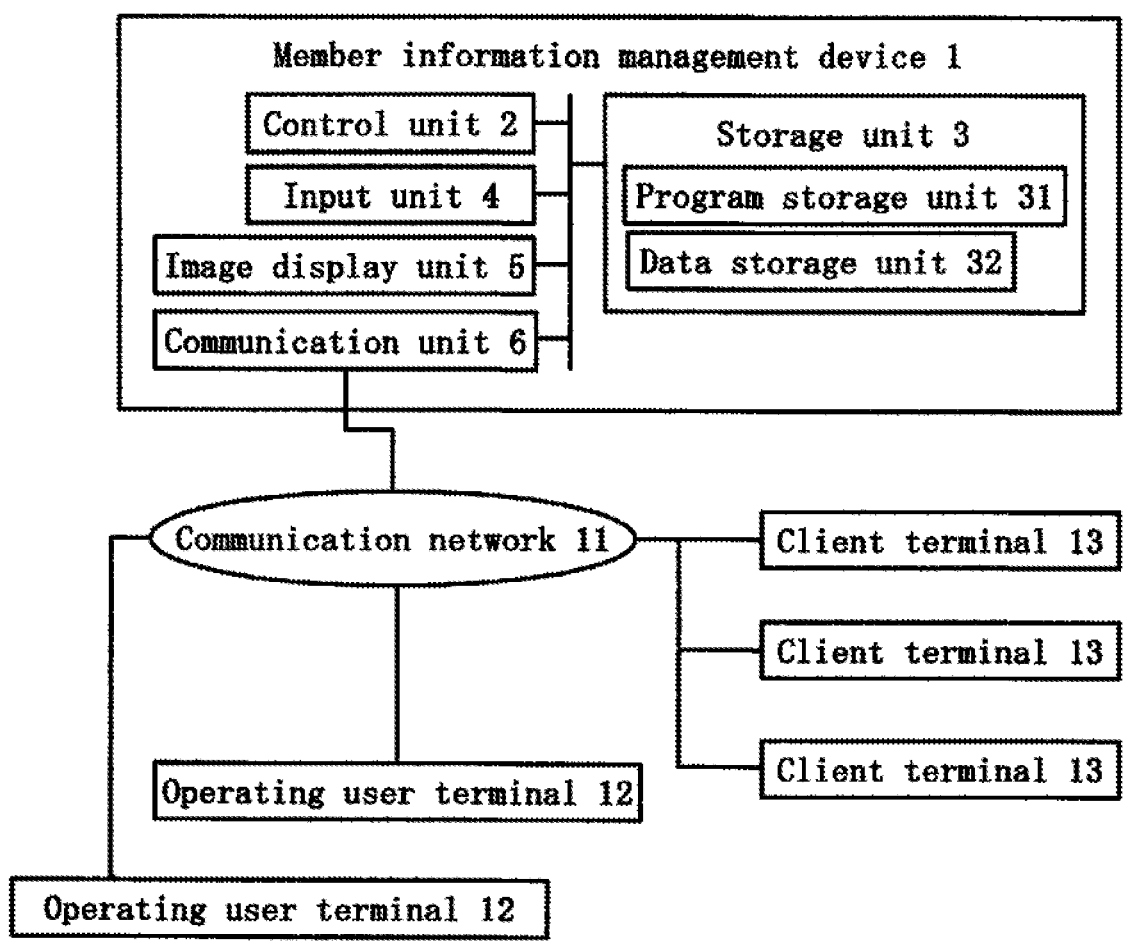
FIG. 1 is a block diagram illustrating an overall configuration of a member information management system, an operating user terminal, and a client terminal according to an embodiment of the present invention.

As illustrated in FIG. 1, a member information management system according to the present embodiment is configured as a member information management device 1. The member information management device 1 is connected to an operating user terminal 12 of an operating user who operates a first stage group to be described later and a client terminal 13 of a member of a second stage group set in the first stage group via a communication network 11 such as an intranet or an extranet such as the Internet.

The member information management device 1 is configured as a single server or a plurality of servers communicably connected together, for example. The member information management device 1 includes a control unit 2 such as a CPU that executes processes according to a predetermined control program, a storage unit 3 such as a memory or a hard disk, an input unit 4 such as a keyboard or a mouse, an image display unit 5 such as a liquid crystal display, and a communication unit 6 that performs a communication connection operation via the communication network 2.

The storage unit 3 includes a program storage unit 31 that stores a control program of the member information management device 1 such as a program of an operating system or a member information management program and a data storage unit 32 that stores data used for processes according to the member information management program.

The operating user terminal 12 and the client terminal 13 are configured as a personal computer, a multi-functional mobile terminal such as a smartphone, or the like, for example. Each of these terminals include a control unit such as a CPU that executes processes according to a predetermined control program, a storage unit such as a memory or a hard disk, an input unit 4 such as a keyboard or a mouse, an image display unit such as a liquid crystal display, and a communication unit that performs a communication connection operation via the communication network 11.

Figure 2:
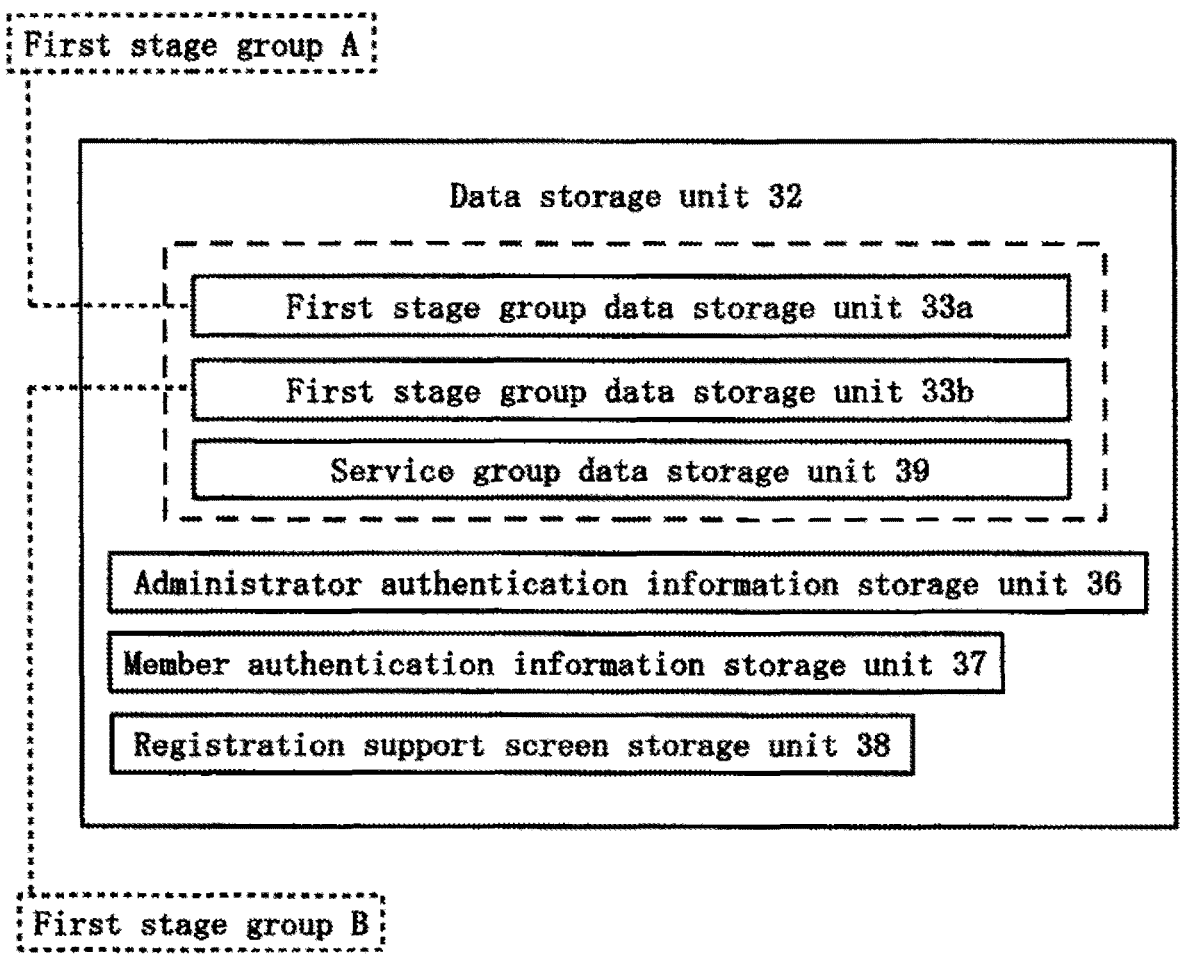
FIG. 2 is a block diagram illustrating a data storage unit in the member information management system according to the embodiment.

As illustrated in FIGS. 2 and 3, first stage group data storage units 333a and 33b that store data of a plurality of first stage groups A and B that provide services having similarity are provided in mutually isolated protection areas of the data storage unit 32 of the member information management device 1. Unique data such as a first stage group ID of the first stage group, an operating user management account, and an operating user password is set and stored in first stage group unique data storage units 331a and 331b of the first stage group data storage units 33a and 33b. The similarity of the first stage groups includes a property that some or all of the service contents are common. The first stage group data storage units 33a and 33b are logically isolated using first stage group names as a separation condition rather than being physically isolated from each other.

Figure 4:
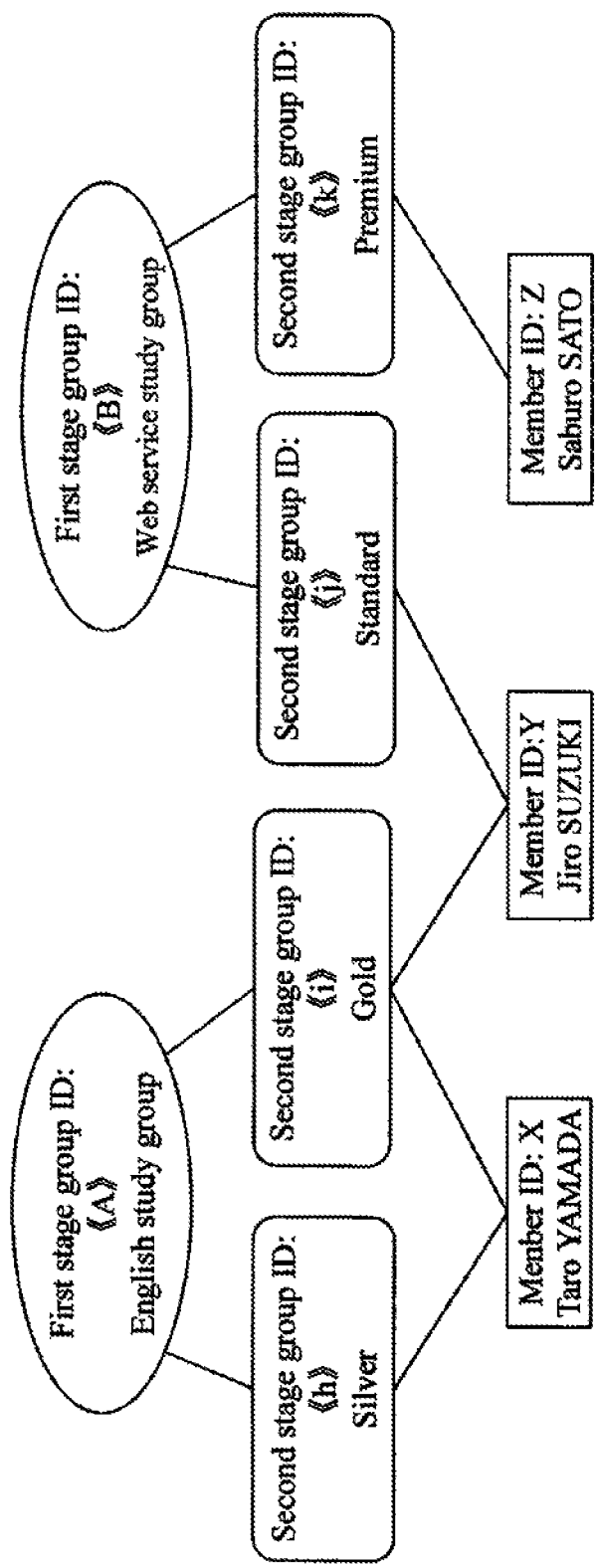
FIG. 4 is a block diagram illustrating the relation among a first stage group, a second stage group, and members in a use example of the member information management system according to the embodiment.

According to the example illustrated in FIG. 4, a plurality of first stage groups is formed by tenants on an online mall, a first stage group A is an English study group, a first stage group B is a Web service study group, second stage groups H and I belonging to the English study group which is the first stage group A are silver and gold members, respectively, second stage groups J and K belonging to the Web service study group which is the second stage group B are standard and premium members, respectively, and members whose member IDs are X, Y, and Z are registered in desired second stage groups. In this example, unique data such as a first stage group ID «A» of the first stage group A, an operating user administration account "admin-A", and an operating user password "xxaxxx" is stored in the first stage group unique data storage unit 331a (see FIG. 5(a)). Unique data such as a first stage group ID «B» of the first stage group B, an operating user administration account "admin-B", and an operating user password "xxbxxx" is stored in the first stage group unique data storage unit 331b (see FIG. 5(b)).

Figure 3A:
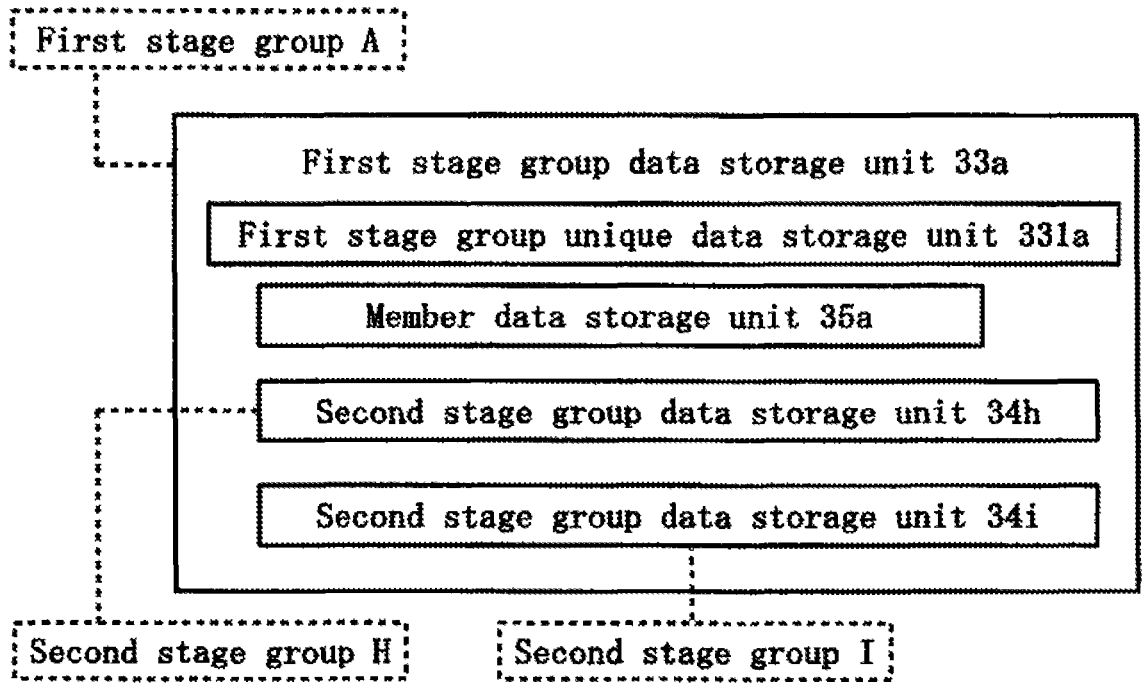
FIGS. 3(a) and 3(b) are block diagrams illustrating a first stage group data storage unit in the member information management system according to the embodiment.
Figure 3B:
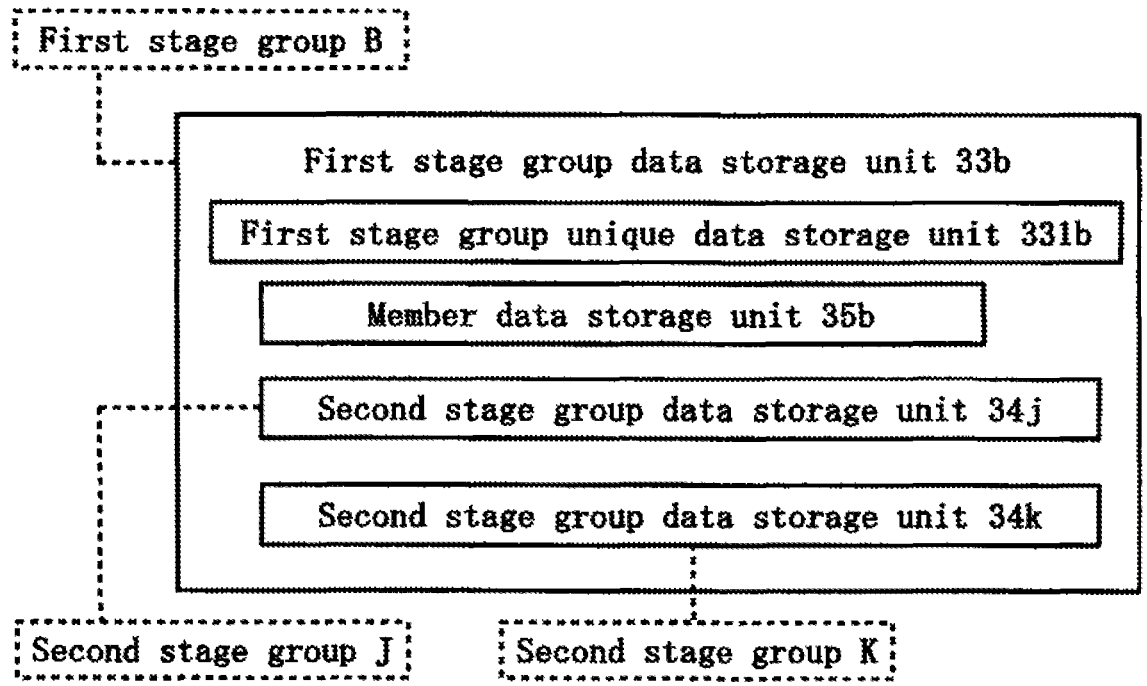

Furthermore, as illustrated in FIG. 3(a) and FIG. 3(b), second stage group data storage units 34h and 34i that store data of the plurality of second stage groups H and I belonging to the first stage group A are provided in the first stage group data storage unit 33a, and second stage group data storage units 34j and 34k that store data of the plurality of second stage groups J and K belonging to the first stage group B are provided in the first stage group data storage unit 33b. The first stage group data storage units 33a and 33b are provided in mutually isolated protection areas. Therefore, the second stage group data storage units 34h and 34i are stored in the first stage group data storage unit 33a of the protection area corresponding to the first stage group A, and the second stage group data storage units 34j and 34k are stored in the first stage group data storage unit 33b of the protection area corresponding to the first stage group B.

The example illustrated in the drawing illustrates a case in which two first stage group data storage units 33a and 33b are set, two second stage group data storage units 34h and 34i of the second stage groups H and I belonging to the first stage group A are set, and two second stage group data storage units 34j and 34k of the second stage group J and K belonging to the first stage group B are set. However, the number of first groups and the number of stage group data storage units corresponding thereto may be set appropriately as long as the numbers are plural. Moreover, the number of second stage groups belonging to each of the first stage groups and the number of second stage group data storage units corresponding thereto may be set appropriately to be singular or plural such as two or more on condition that the numbers can be set to be plural.

Data of the second stage groups H and I is stored in the second stage group data storage units 34h and 34i in the first stage group data storage unit 33a. Data including the second stage group ID of the second stage group H, the first stage group ID of the first stage group A to which the second stage group H belongs, registration form presentation data of the second stage group H, and contents presentation data of the second stage group H are stored in the second stage group data storage unit 34h. Data including the second stage group ID of the second stage group I, the first stage group ID of the first stage group A to which the second stage group H belongs, registration form presentation data of the second stage group I, and contents presentation data of the second stage group I are stored in the second stage group data storage unit 34i.

Data of the second stage groups J and K is stored in the second stage group data storage units 34j and 34k in the first stage group data storage unit 33b. Data including the stage group ID of the second stage group J, the first stage group ID of the first stage group B to which the second stage group J belongs, registration form presentation data of the second stage group J, and contents presentation data of the second stage group J is stored in the second stage group data storage unit 34j. Data including the second stage group ID of the second stage group K, the first stage group ID of the first stage group B to which the second stage group K belongs, registration form presentation data of the second stage group K, and contents presentation data of the second stage group K is stored in the second stage group data storage unit 34k.

The registration form presentation data stored in the second stage group data storage units 34*h*, 34*i*, 34*j*, and 34*k* includes data of an information string (an information string number and the content thereof) that defines necessary input items acquired from a member applicant using a registration form stored separately, a registration form ID for specifying display screen data of the registration form stored separately, and the like, for example. The storage location for storing the information string data that defines the necessary input items separately may be another storage area of the first stage group data storage units 33*a* and 33*b*. Moreover, the information string data that defines the necessary input items acquired from a member applicant using a registration form may be stored in the second stage group data storage units 34*h*, 34*i*, 34*j*, and 34*k* as presentation data. Furthermore, the storage location for storing the display screen data of the registration form separately may be another storage area of the first stage group data storage units 33*a* and 33*b* or another storage area of the data storage unit 32, for example. Moreover, the registration form display screen data may be stored in the second stage group data storage units 34*h*, 34*i*, 34*j*, and 34*k* as presentation data.

The contents presentation data stored in the second stage group data storage units 34*h*, 34*i*, 34*j*, and 34*k* include a contents ID for specifying the display screen data of member contents stored separately, for example. The storage location for storing the contents display screen data separately may be another storage area of the first stage group data storage units 33*a* and 33*b* or another storage area of the data storage unit 32, for example. Moreover, the contents display screen data may be stored in the second stage group data storage units 34*h*, 34*i*, 34*j*, and 34*k* as presentation data.

In the example of FIG. 4, a second stage group name (membership name) illustrated in FIGS. 6(*a*) to 6(*d*), a second stage group ID (membership ID), a first stage group ID (tenant ID) to which the second stage group belongs, a registration form ID corresponding to a registration form presentation data of the second stage group, and a contents ID corresponding to the contents presentation data of the second stage group are stored in the second stage group data storage units 34*h*, 34*i*, 34*j*, and 34*k*. Moreover, the registration form ID illustrated in FIGS. 7(*a*) and 7(*b*), the stage group ID (tenant ID), and a registration form-information string number table in which the information string numbers that define the necessary input items acquired from the member applicant using the registration form in correspondence with the second stage group are stored in correlation are stored in the other storage areas of the first stage group data storage units 33*a* and 33*b* such as the first stage group unique data storage units 331*a* and 331*b*. In the example of the registration form-information string number table illustrated in FIG. 7(*a*) and FIG. 7(*b*), the orders in which respective information strings are displayed the registration form display screen are set.

Furthermore, the data of members registered from the registration form of the second stage group H or I belonging to the first stage group A (that is, members who belong to the first stage group A and the second stage group H or I in the first stage group A) is stored in the member data storage unit 35*a* of the first stage group data storage unit 33*a* of the protection area. Similarly, the data of members registered from the registration form of the second stage group or K belonging to the first stage group B (that is, members who belong to the first stage group B and the second stage group J or K in the first stage group B) stored in the member data storage unit 35*b* the first stage group data storage unit 33*b* of the protection area.

The member data stored in the member data storage unit 35*a* includes a second stage group ID which is specific data for specifying the second stage group H or I to which a member belongs, a first stage group ID which is specific data for specifying the first stage group A to which the second stage group H or I belongs, and unique information of the member. Similarly, the member data stored in the member data storage unit 35*b* includes a second stage group ID which is specific data for specifying the second stage group S or K to which a member belongs, a first stage group ID which specific data for specifying the first stage group B to which the second stage group J or K belongs, and unique information of the member. The member unique information stored in the member date storage units 35*a* and 35*b* is a member ID, a name, an address, an email address, a telephone number, and the like, for example.

In the example illustrated in FIG. 4, in a configuration in which the member table illustrated in FIG. 8(*a*) and FIG. 8(*b*) and the member information definition table illustrated in FIG. 9(*a*) and FIG. 9(*b*) are set to the member data storage units 35*a* and 35*b*, for example, the second stage group ID (membership ID), the first stage group ID (tenant ID) to which the second stage group ID belongs, a member name, a member ID, and an email address are stored in common in the member data storage units 35*a* and 35*b*. An address, a name, an email address, and a telephone number are stored in the member data storage unit 35*a* that stores the member data of the first stage group A as a member information table corresponding to the member information definition table. Moreover, an address, a name, a position, a telephone number, and an email address are stored in the member data storage unit 35*b* that stores the member data of the first stage group B as a member information table corresponding to the member information definition table (see FIG. 10(*a*) and FIG. 10(*b*)). The member information table illustrated in FIG. 10(*a*) and FIG. 10(*b*) illustrates an example in which a member having the member ID X and a member having the member ID Y are silver and gold. members of the first stage group A, respectively, and a member having the member ID Y and a member having the member ID Z are premium members of the second stage group B.

The administrator authentication information storage unit 36 that stores administrator authentication information is provided in the data storage unit 32 of the member information management device 1 as an administrator projection area isolated from the first stage group data storage units 33*a* and 33*b*, the administrator protection area being a surge area other than the first stage group data storage units 33*a* and 33*b* which are the protection areas corresponding to the first stage groups A and B. An administrator ID and an administrator password, for example, are stored in the administrator authentication information storage unit 36. The first stage group data storage units 33*a* and 33*b* and the administrator authentication information storage unit 36 are logically isolated using authentication information as a separation condition rather than being physically isolated from each other.

The member authentication information storage unit 37 that stores member authentication information corresponding to a member ID is provided in the data storage unit 32 of the member information management device 1 as a member authentication protection area isolated from the first stage group data storage units 33*a* and 33*b* and the administrator authentication information storage unit 36, the member authentication protection area being a storage area other than the first stage group data storage units 33*a* and 33*b* and the administrator authentication information storage unit 36 which are the protection areas corresponding to the first stage groups A and B. A member ID and a member password, for example, are stored in the member authentication information storage unit 37. The member authentication protection areas are logically isolated using authentication information as a separation condition.

A registration support screen for supporting a member registration process from registration form with respect to the plurality of first stage groups A and B is stored in the registration support screen storage unit 38 of the data storage unit 32. This registration support screen includes a screen for prompting the client terminal 13 to select data and guiding the client terminal to a registration form and an approval screen displayed when registration is approved.

Figure 11:
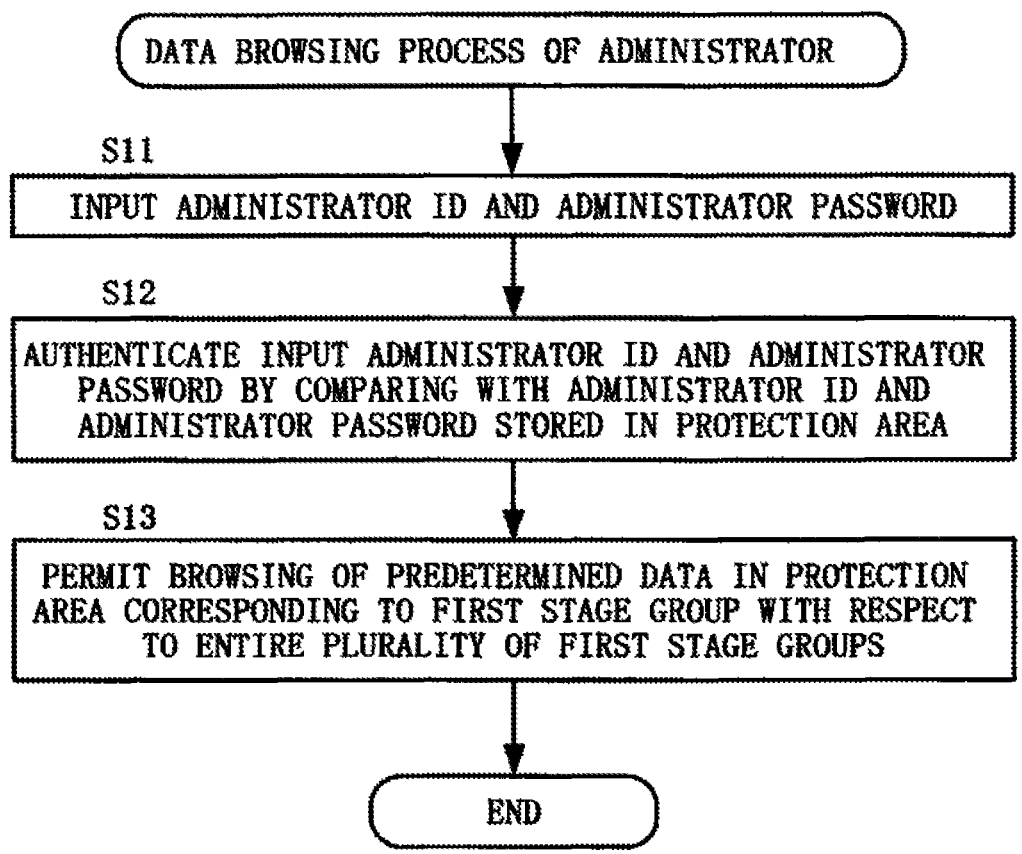
FIG. 11 is a flowchart illustrating the flow of a data browsing process of an administrator in the member information management system according to the embodiment.

The member information management device 1 that executes a predetermined process according to a member information management program receives a login operation of an administrator of an entire system including the plurality of first stage groups according to data input from the input unit 4 as illustrated in FIG. 11 in a data browsing process of the administrator, extracts an administrator password corresponding to an administrator ID stored in the administrator authentication information storage unit 36 in correspondence with an input administrator ID in response to the login operation, compares the input administrator password with a stored administrator password, and performs an authentication process (S11 and S12). When the two administrator passwords are identical and authentication is successful, browsing of predetermined data in the protection areas corresponding to the first stage groups A and B (that is, browsing of predetermined data stored in the first and second stage group data storage units 33a and 33b) is permitted and it is possible to access these pieces of data (S13). The predetermined data for which browsing is permitted may be all pieces of data stored in the first and second stage group data storage units 33a and 31b or may be predetermined pieces of data among these piece of data.

Figure 12:
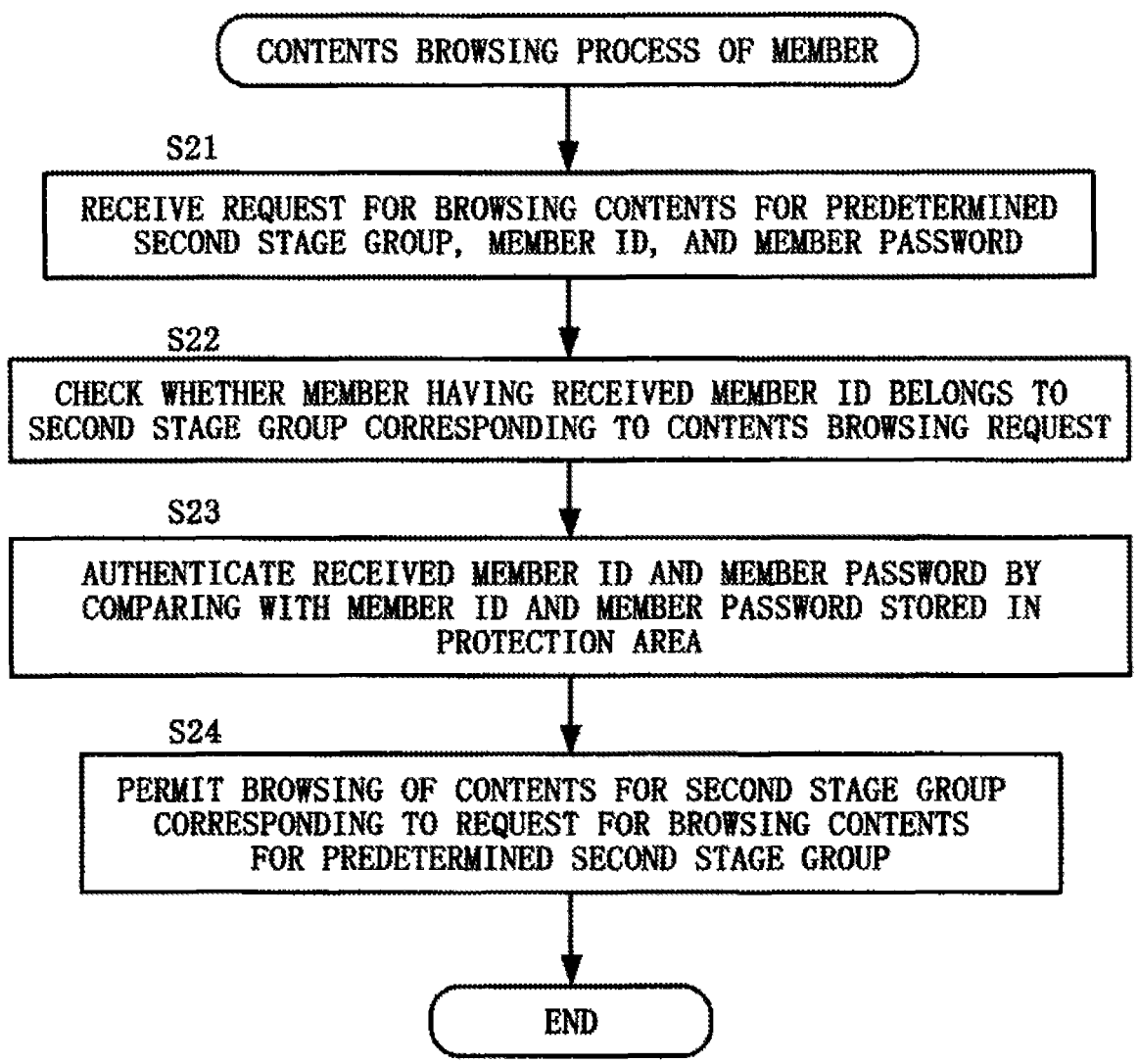
FIG. 12 is a flowchart illustrating the flow of a contents browsing process of a member in the member information management system according to the embodiment.

The member information management device 1 that executes a predetermined process according to a member information management program receives a login operation of a member on the basis of transmission of a browse request for desired second stage group contents, a member ID, and a member password transmitted from the client terminal 13 in the contents browsing process of the member and checks whether a member having the member ID has the second stage group ID of the second stage group corresponding to the contents as requested in the browse request on the basis of the member data of the member data storage unit 35a or 35b (S21 and S22) as illustrated in FIG. 12. When it is confirmed that the member of the member ID has the second stage group ID and the member belongs to the second stage group, the member information management device 1 extracts a member password corresponding to the member ID stored in the member authentication information storage unit 37, compares the received member password with the stored member password, and performs an authentication process (S23). When the two member passwords are identical and authentication is successful, browsing of the contents of the second stage group corresponding to the second stage group ID is permitted, and the contents are transmitted and presented to the client terminal 13 (S24). Comparing of the member passwords, the authentication process, and the process of checking whether the member having the member ID has the second stage group ID of the second stage group corresponding to the contents requested in the browse request may be performed in a reverse order.

The member information management device 1 is configured such that the same member can be registered so as to belong to the plurality of second stage groups H and I belonging to the same first stage group A or the same member can be registered so as to belong to the plurality of second stage groups J and K belonging to the same first stage group B. In this case, the second stage group for specifying the second stage group H or J to which a member belongs and the second stage group ID for specifying the second stage group I or K are stored in the member data stored in the member data storage unit 35a or 35b in correlation with the unique information of the member.

Furthermore, the member information management device 1 is configured such that the same member can be registered so as to belong to the second stage group H or I or both of the first stage group A and the second stage group J or K or both of the second stage group B among different first stage groups A and B of the plurality of first stage groups A and B. In this case, the member unique information is stored in both the member data storage unit 35a of the first stage group A and the member data storage unit 35b of the first stage group B, and the second stage group ID of the second stage group to which the member belongs and the member unique information are stored in each of the member data storage units 35a and 35b in correlation (see FIGS. 4 and 8).

Figure 13:
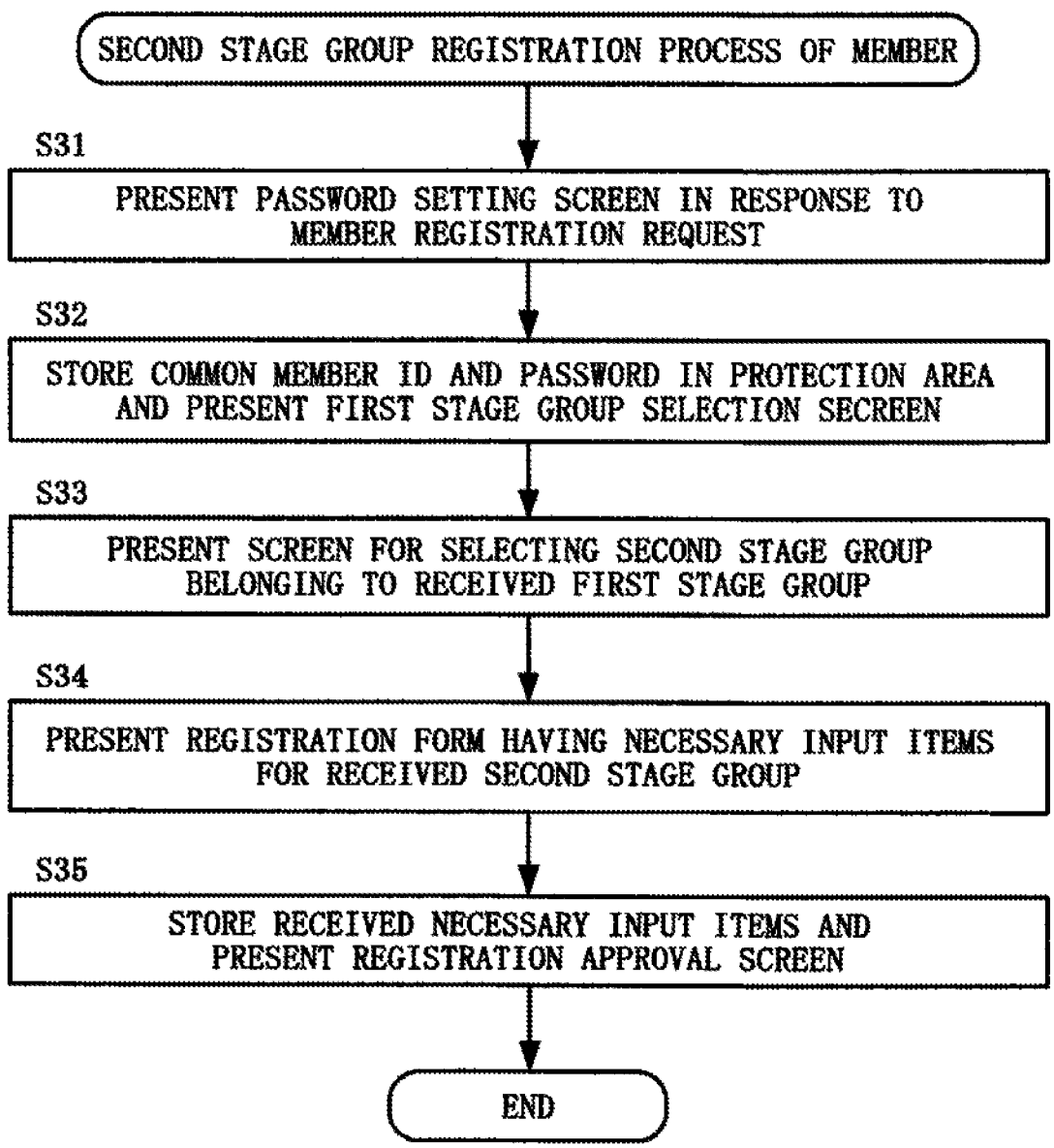
FIG. 13 is a flowchart illustrating the flow of a process of registering members to a second stage group by a member in the member information management system according to the embodiment.

In the member information management device 1, when a member registers himself or herself for an arbitrary first stage group or the like, as illustrated in FIG. 13, for example, the member information management device 1 describes member IDs for the plurality of first stage groups A, B, and the like upon receiving a member registration request from the client terminal 13 and presents a password setting screen for prompting the input of a registration password corresponding to the member ID (S31). The member information management device 1 stores the member ID and the registered password in the member authentication information storage unit 37 upon receiving the password input on the password setting screen from the client terminal 13 and presents a first stage group selection screen for prompting the selection of a plurality of predetermined first stage groups A and B set to the member information management device 1 (S32).

When the same member is registered for the member ID and the password set and stored in the member authentication information storage unit 37 so that the same member belongs to the second stage groups H, I, J, and K in different first stage groups A and B among all of the plurality of first stage groups A and B, for example, the same member ID and the same password which is the member authentication information are used for an authentication process for permitting browsing of the contents of the second stage group H or I in the first stage group A and an authentication process for permitting browsing of the contents of the second stage group J or K in the first stage group B. In other words, the same member ID and the same password are used for all of the plurality of first stage groups A and B.

After that, the member information management device 1 presents a second stage group selection screen for prompting the selection of the plurality of predetermined second stage groups H and I when it is confirmed that a plurality of second stage groups H and I is set in the first stage group A in the first stage group data storage unit 33a, for example, by checking the second stage group ID corresponding to the first stage group ID upon receiving designation of the first stage group A selected on the first stage group selection screen from the client terminal 4 (S33). When a singular second stage group H or I only is set in the first stage group A, the member information management device 1 presents a second stage group selection screen for prompting designation of a singular second stage group H or I, for example. In S32 and S33, the member ID and the registered password may be stored in the member authentication information storage unit 37 without presenting the first stage group selection screen and the second stage group selection screen may be presented directly. Moreover, when registration of a member to the second stage group H to be described later is completed, for example, the member may be automatically registered to the first stage group A to which the second stage group H belongs.

After that, the member information management device 1 acquires a registration form from the registration form presentation data of the second stage group H of the second stage group data storage unit 34*h* upon receiving the designation of the second stage group H selected or designated on the second stage group selection screen from the client terminal 13 and presents a registration form having necessary input items for the second stage group H acquired from a member applicant on an image display unit of the client terminal 13 (S34). The member information management device 1 checks that the data of all necessary input items has been input upon receiving the data input to the necessary input items of the registration form from the client terminal 13, stores the necessary input item data in the member data storage unit 35*a*, and transmits and presents a registration approval screen indicating that the registration of the member to the second stage group H has been completed to the client terminal 13 (S35).

Figure 14:
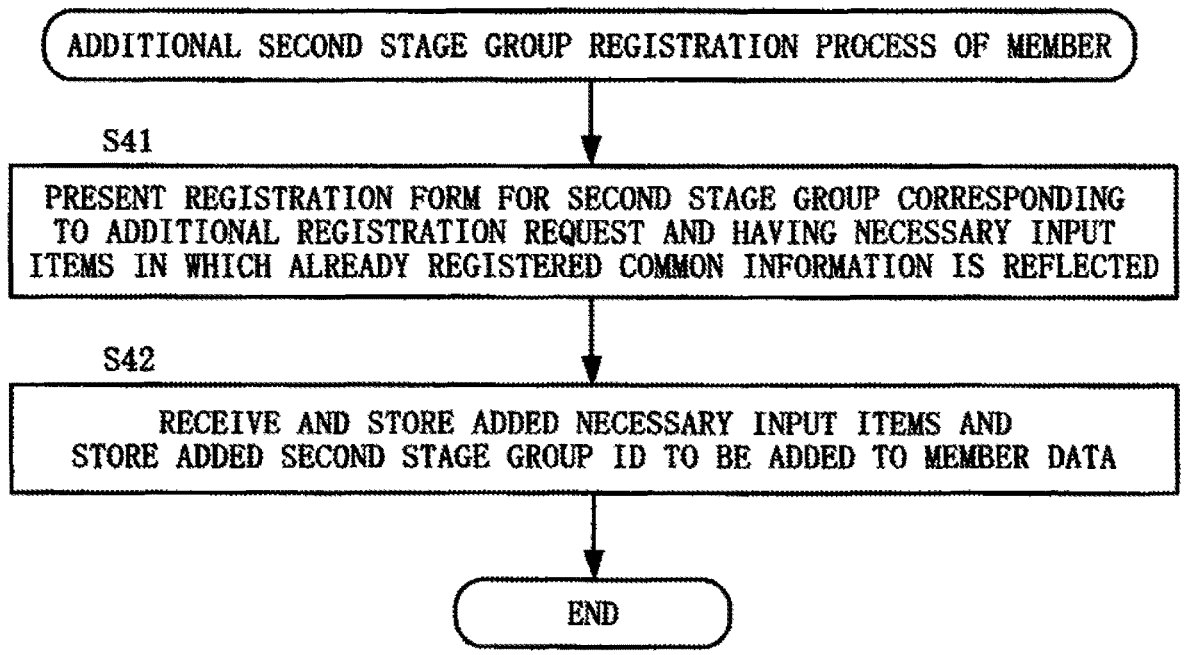
FIG. 14 is a flowchart illustrating the flow of an additional second stage group registration process of a member in the member information management system according to the embodiment.

In the member information management device 1, when a member who has been already registered to the second stage group H of the first stage group A, for example, tries to register to the second stage group I of the first stage group A as a member, the member information management device 1 acquires a registration form from the registration form presentation data of the second stage group I of the second stage group data storage unit 34*h* upon receiving a request for additional member registration to the second stage group I of the first stage group A from the client terminal 13 on the basis of designation of and additional input to the second stage group I on the second stage group selection screen, for example, as illustrated in FIG. 14, and presents a registration form having the necessary input items for the second stage group I acquired from a member applicant on the image display unit of the client terminal 13 (S41). The necessary input items of the registration form are presented in such a form that common information stored in advance in the member data storage unit 35*a* during registration of the member to the second stage group H is reflected therein and is already input.

When the necessary input items of the registration form of the second stage group H are different from those of the registration form of the second stage group I, a member who is already registered inputs and transmits different necessary input items only, and the member information management device 1 additionally stores the items in the member data storage unit 35*a* upon receiving the different necessary input items. When the necessary input items are identical, the member information management device 1 receives confirmation information of the content of the necessary input items confirmed by the already registered member and maintains the data input to the member data storage unit 35*a*. Furthermore, the member information management device 1 additionally stores the second stage group ID of the second stage group I corresponding to the specific data for specifying the other second stage group I registered additionally in correlation with the necessary data of the member stored in the member data storage unit 35*a* (S42). In the examples illustrated in FIGS. 4 to 10, when the member who is already registered to the second stage group H of the first stage group A is additionally registered to the second stage group I, the necessary input item that is additionally received and stored is the position.

Figure 15:
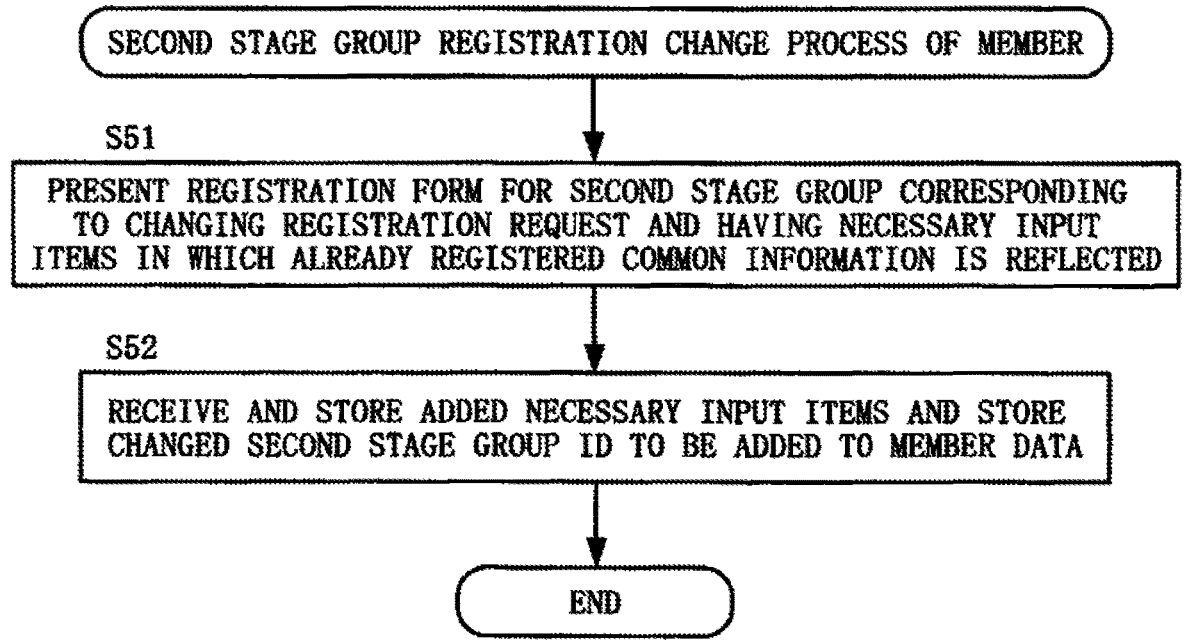
FIG. 15 is a flowchart illustrating the flow of a second stage group registration change process of a member in the member information management system according to the embodiment.

In the member information management device 1, when a member who is already registered to the second stage group H of the first stage group A, for example, tries to change the registration so as to be registered to the second stage group I of the first stage group A as a member, the member information management device 1 acquires a registration form from the registration form presentation data of the second stage group H of the second stage group data storage unit 34*h* upon receiving a request for changing the registration so as to be registered to the second stage group I of the first stage group A as a member from the client terminal 13 on the basis of the input of the designation of and the change to the second stage group I on the second stage group selection screen, for example, as illustrated in FIG. 15 and presents a registration form having the necessary input items for the second stage group I acquired from the member applicant on the image display unit of the client terminal 13 (S51). The necessary input items of the registration form are presented in such a form that common information stored in advance in the member data storage unit 35*a* during registration of the member to the second stage group H is reflected therein and is already input.

When the necessary input items of the registration form of the second stage group H are different from those of the registration form of the second stage group I, a member who is already registered inputs and transmits different necessary input items only, and the member information management device 1 additionally stores the items in the member data storage unit 35*a* upon receiving the different necessary input items. When the necessary input items are identical, the member information management device 1 receives confirmation information of the content of the necessary input items confirmed by the already registered member and maintains the data input to the member data storage unit 35*a*. Furthermore, the member information management device removes the second stage group ID of one second stage group H corresponding to the specific data for specifying the second stage group H to which the member was registered before the change from the necessary data of the member stored in the member data storage unit 35*a* and stores the second stage group ID of the second stage group I corresponding to the specific data for specifying the other second stage group I to which the member is registered in correlation with the necessary data of the member stored in the member data storage unit 35*a* (S52). In the examples illustrated in FIGS. 4 to 10, when the member who is already registered to the second stage group H of the first stage group A changes the registration so as to be registered to the second stage group I, the necessary item that is additionally received and stored is the position. A reverse case does not occur end it is only necessary to transmit and receive a confirmation.

As illustrated in FIG. 2, the service group data storage unit 39 that stores service group data is provided on the same layer as the plurality of first stage groups A and B. The stored service group data includes the unique information of the operating users who operate the plurality of first stage groups A and B and the presentation data of the service contents provided in common to the operating users. The service group data storage unit 39 and the first stage group data storage units 33a and 33b are logical isolated using the first stage group name and the service group name as a separation condition. The operating user can connect to the member information management device 1 via the communication network 11 from the operating user terminal 12 and browse the service contents stored in the service group data storage unit 39. The unique information of the operating user stored in the service group data storage unit 39 is the first stage group ID for specifying the first stage group A or B operated by the operating user, the operating user password corresponding to the first stage group ID, a name, an address, an email address, a telephone number, and the like, for example.

The service contents presentation data stored in the service group data storage unit 39 includes a service contents ID or the like for specifying the display screen data of the service contents for the operating user stored separately, for example (see FIG. 16). The storage location of the display screen data of the service contents stored separately may be an appropriate location such as another storage area of the data storage unit 32. Moreover, the display screen data of the service contents may be stored in the service group data storage unit 39 as presentation data.

Figure 17:
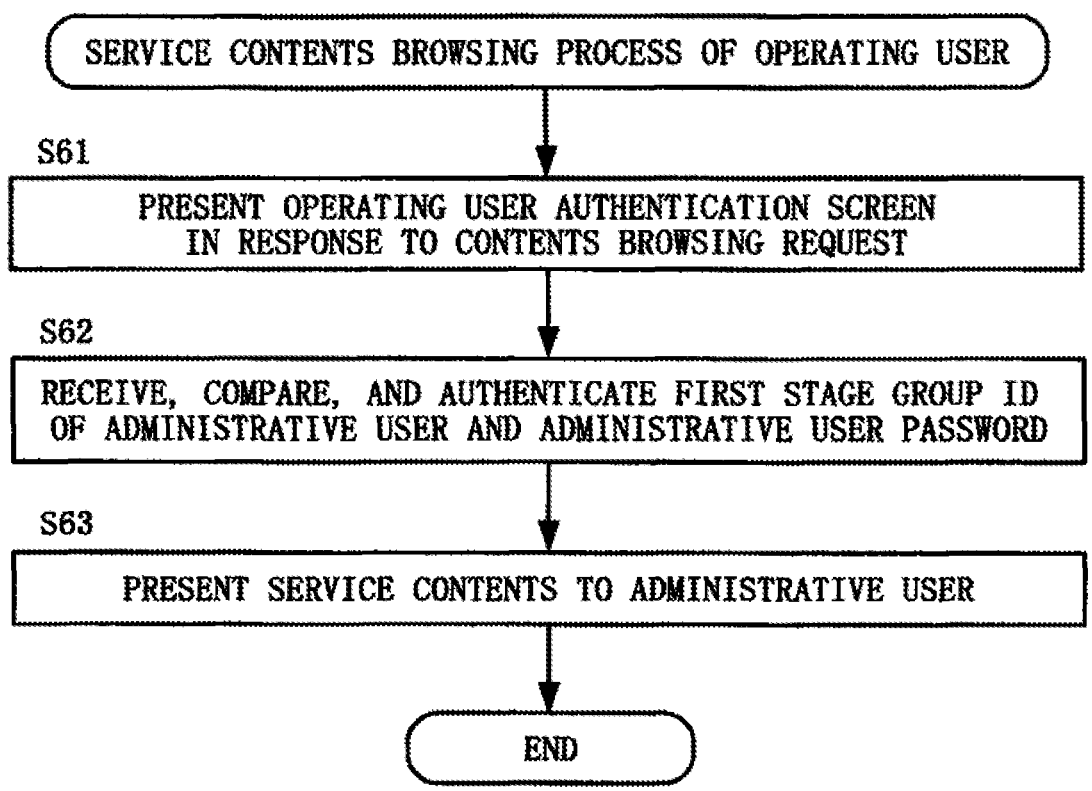
FIG. 17 is a flowchart illustrating the flow of a service contents browsing process of an operating user in the member information management system according to the embodiment.

When the operating user browses the service contents for the operating user, the operating user connects to the member information management device 1 via the communication network 11 from the operating user terminal 12, and the member information management device 1 presents an authentication screen for the operating user upon receiving a contents browse request (S61) as illustrated in FIG. 17, receives and authenticates the first stage group. ID for specifying the first stage group A or B operated by the operating user input from the operating user authentication screen and the operating user password corresponding to the first stage group ID by comparing the same with the first stage group ID and the operating user password stored in the service group data storage unit 39 (S62). When authentication was successful, the member information management device 1 reads the service contents corresponding to the service contents ID stored in the service group data storage unit 39, and presents the read service contents to the operating user terminal 12 (S63).

Figure 18:
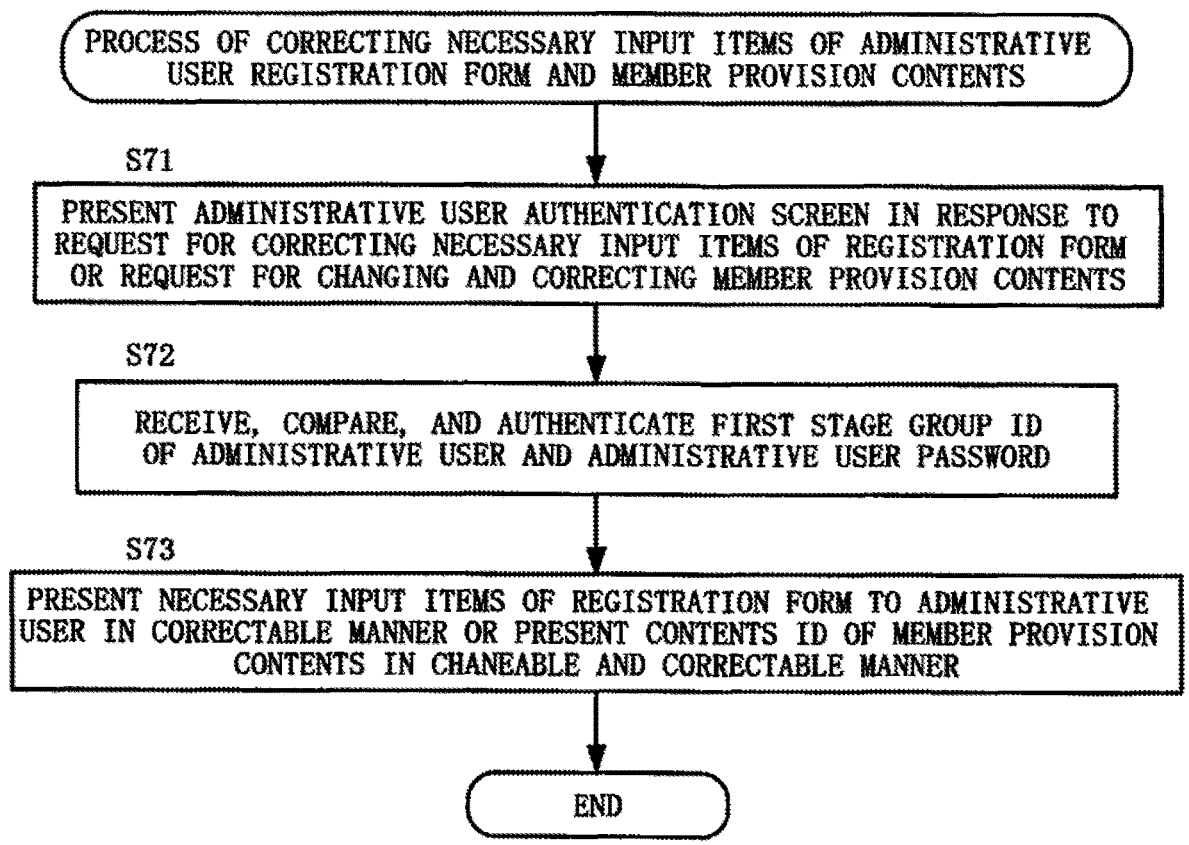
FIG. 18 is a flowchart illustrating the flow of a registration form correction process or a member provision contents correction process of an operating user in the member information management system according to the embodiment.

When the operating user corrects the necessary input items of the registration form of the second stage group H, I, J, or K belonging to the first stage group A or B or changes or corrects the contents to be provided to members, the operating user connects to the member information management device 1 via the communication network 11 from the operating user terminal 12, and the member information management device 1 presents an operating user authentication screen upon receiving a request for correcting the necessary input items of the registration form or a request for changing or correcting the contents to be provided to members as illustrated in FIG. 18 (S71) and performs an authentication process of comparing the first stage group ID for specifying the first stage group A or B operated by the operating user input from the operating user authentication screen and the operating user password corresponding to the first stage group ID with the first stage group ID and the operating user password stored in the first stage group unique data storage unit 331a or 331b (S72).

When authentication was successful, the member information management device 1 presents the content of the information strings of the necessary input items of the registration form-information string number table (see FIG. 7(a) and FIG. 7(b)) stored in the first stage group data storage unit 33a or 33b to the operating user terminal 12 so that the content of the information strings of the necessary input items can be corrected. Alternatively, the member information management device 1 presents the contents ID of the contents to be provided to the members stored in the second stage group data storage unit 34h, 34i, 34j, or 34k of the first stage group data storage unit 33a or 33b to the operating user terminal 12 so that the contents ID (see FIG. 6(a) and FIG. 6(d)) of the contents can be changed or corrected (S73).

According to the member information management system of the present embodiment, an operating user can set second stage groups on the same layer in an operation system corresponding to a first stage group and operate a business or the like. Furthermore, an administrator of the entire plurality of first stage groups that provide services having similarity can browse predetermined data of respective first stage groups while protecting the data of the individual first stage groups operated by the operating users. In this way, the administrator can provide an advice, information, and the like to the operating user using the respective pieces of predetermined data as resources. That is, the operating user who sets the second stage groups on the same layer in the operation system corresponding to the first stage group and operates a business or the like can receive a service such as an advice or provision of information from the outside.

Moreover, by providing a platform that manages the entire plurality of first stage groups in an integrated manner, many applicants can easily operate the operation system corresponding to the first stage group. A person who wants to use the operation system that sets groups the same layer in the entire system can easily use the operation system. Moreover, the member information management device can be used by an arbitrary business operator of various business types regardless of a business category as long as an operating user can set second stage groups on the same layer in an operation system corresponding to a first stage group and operate a business. Therefore, the member information management device provides excellent versatility and flexibility.

Moreover, members can belong to different second stage groups in an operation system corresponding to an arbitrary first stage group and can participate in an operation system corresponding to another first stage group. Therefore, it is possible to enhance the convenience of members. Moreover, a member who has registered to one second stage group belonging to a first stage group can additionally register to another second stage group belonging to the same first stage group or can change the registration so as to be registered to another second stage group belonging to the same first stage group. Therefore, a group to which the member belongs can be flexibly added or changed with little labor.

A member password corresponding to a member ID is stored in a member authentication protection area so that the password for the same member is protected and managed independently from the plurality of first stage groups. Even when the information on registered members is spilled from an operation system corresponding to an arbitrary first stage group operated by an operating user, it is possible to prevent leakage of the member authentication information and to improve the security of the operating user and the members. Moreover, it is possible to lessen the labor associated with self-safety control of the authentication information, of members participating in a plurality of operation systems corresponding to a plurality of first stage groups.

When a member who has already registered to one second stage group belonging to a first stage group additionally registers to another second stage group belonging to the same first stage group, it is possible to lessen the member's labor associated with registration by presenting a registration form by reflecting the information which is already stored in the necessary input items of the registration form.

By providing the service group data storage unit 39 in the same layer as the plurality of first stage groups, it is possible to efficiently provide a service based on service contents such as an advice or provision of information using the data structure of the first stage group without using additional system resources. Moreover, since management of the same kind as the management of the first stage group can be used for management the service group, it is possible to lessen the labor associated with management of the service group.

[Modifications of Embodiment]

Besides configurations of each invention, each embodiment, and the like, the invention disclosed herein encompasses variations specified by modifying these partial configurations to other configurations disclosed herein, variations specified by adding other configurations disclosed herein to these, configurations, and broader concepts specified by removing these partial configurations to the extent that a partial functional effect is produced. The invention disclosed herein also encompasses the following variations.

For example, in the member information management system or the member information management device according to the present invention, some or all of the control units 2 and some or all of the storage units 3 may be provided at remote sites and may be connected by a communication network. Moreover, examples of the services having similarity provided by the plurality of first stage groups include any services having certain similarity such as, for example, services for selling travel or event tickets, products, and the like, as well as the learning services mentioned in the embodiment and include both paid and free services.

Preferably, for example, an event entry contents storage unit 3411h and an event contents storage unit 3412h may be provided in a contents storage unit 341h of a second stage group data storage unit 34h or the like, and an event entry data storage unit 342h may be provided in the second stage group data storage unit 34h. The control unit 2 of the member information management device 1 may present event entry contents to members of the second stage group as contents and store an event ID of a specific event and a member ID of a member who has input an entry to the specific event in the event entry data storage unit 342h in correlation upon receiving the input the entry to the specific event from the client terminal. The control unit 2 may provide the event by presenting the event contents to the client terminal in response to an event contents presentation request from the client terminal when a predetermined time point arrives (see FIG. 19(a) and FIG. 19(b)). This event may be a social event such as a meeting or a performance held in a specific place as well as an event which can be provided online.

Preferably, the event entry contents may be appropriate contents capable of representing the entry of a specific event, and the contents may include an event content such as, for example, an event name, an event description, an instructor, a meeting place, a fixed number of people, and ticket information, and a holding period or a provision period of the event. The event content such as event name, the event description, the instructor, the meeting place, the fixed number of people, and the ticket information and the holding period or the provision period of the event may be stored separately in the event entry contents storage unit 3411h or the like. The event content may be stored in the event entry contents storage unit 3411h or the like so that the event ID is correlated with the holding period or the provision period of the event. The event ID and the member ID may be stored in the event entry data storage unit 342h in correlation with each other. In this way, the entry is realized.

Figure 19A:
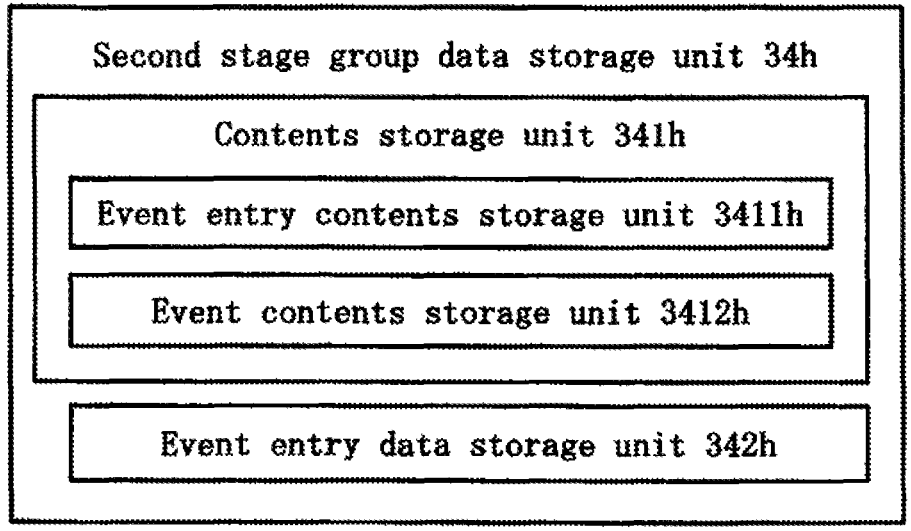
FIG. 19(a) is a block diagram illustrating a storage example of data related to an event in the second stage group data storage unit.
Figure 19B:
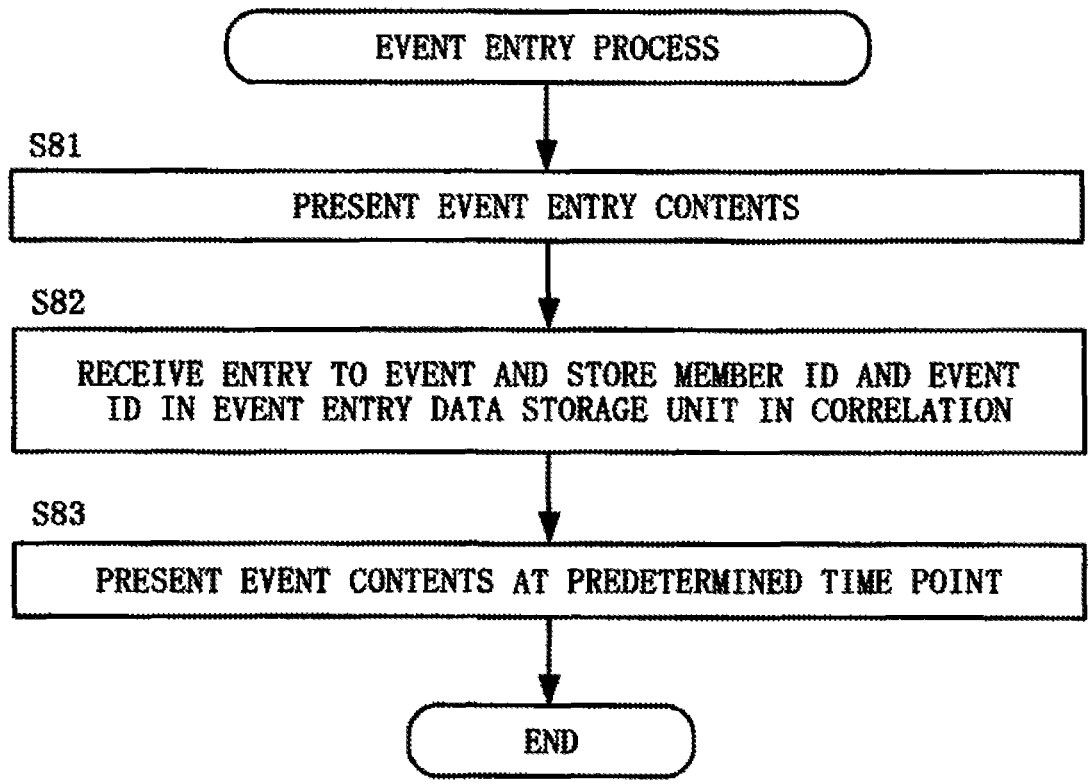
FIG. 19(b) is a flowchart illustrating an example of an event entry process.
Figure 20:
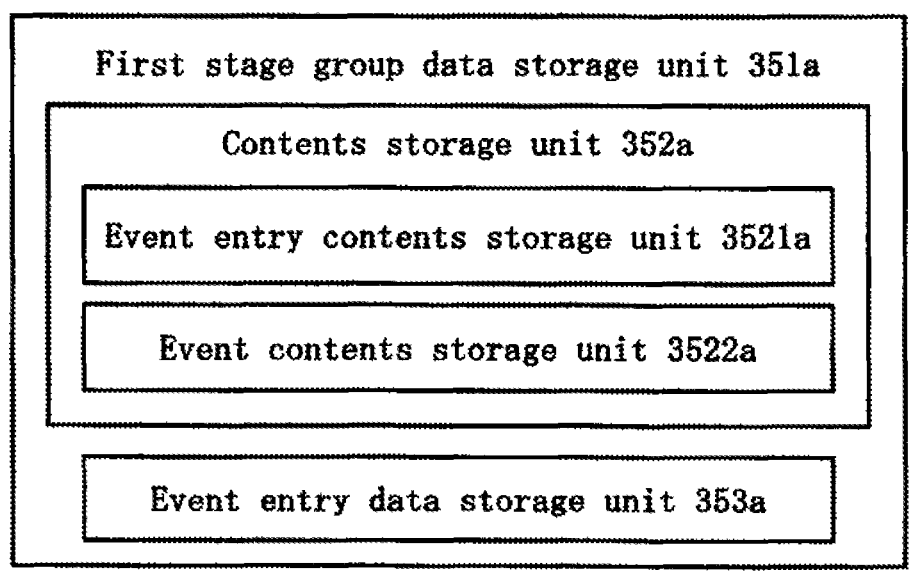
FIG. 20 is a block diagram illustrating a storage example of a first stage group event data storage unit in the first stage group data storage unit.

The first stage group event data storage unit 351a or the like may be provided in the first stage group data storage unit 33a or the link. An event entry contents storage unit 3521a and an event contents storage unit 3522a may be provided in the contents storage unit 352a in the first stage group event data storage unit 351a. The event entry data storage unit 353a may be provided in the first stage group event data storage unit 351a. The control unit 2 of the member information management device 1 may present event entry contents to members of the first stage group as contents and store an event ID of a specific event and a member ID of a member who has input an entry to the specific event in the event entry data storage unit 353a in correlation upon receiving the input of the entry to the specific event from the client terminal. The control unit 2 may provide the event by presenting the event contents to the client terminal in response to an event contents presentation request from the client terminal when a predetermined time point arrives (see FIG. 20). As for the content of the event content, the content of the event entry contents, a method of storing the same, and the event itself, the configuration as illustrated in FIG. 19(a) and FIG. 19(b) may be used appropriately.

Preferably, a target ID that defines a predetermined target may be input, for example, and the control unit 2 of the member information management device 1 may set and store the target IDs corresponding to respective members in the member table of the member data storage unit and may extract and output members having a specific target ID according to the input of the extracted specific target ID. In this way, it is easy to suggest a benefit, an event or the like to members having a predetermined attribute (see FIG. 20.

The specific target ID may be appropriately set to all members belonging to a specific second stage group, or members selected among the members according to a predetermined condition, or members who participate in a specific event among the members.

INDUSTRIAL APPLICABILITY

The present invention can be used in an Information management system of a business form in which a plurality of types of Internet shops and Internet services are operated on an online mall and members are grouped into standard and premium members for each Internet shop and Internet service.

REFERENCE SIGNS LIST

1 Member information management device
2 Control unit
3 Storage unit
31 Program storage unit
32 Data storage unit
A, B First stage group
33a, 33b First stage group data storage unit
331a, 331b First stage group unique data storage unit
H, I, J, K Second stage group
34h, 34i, 34j, 34k Second stage group data storage unit
341h Contents storage unit 3411*h* Event entry contents storage unit
3412*h* Event contents or storage unit
342*h* Event entry data storage unit
35*a*, 35*b* Member data storage unit
351*a* First Stage group event data storage unit
352*e* Contents storage unit
3521*a* Event entry contents storage unit
3522*a* Event contents storage unit
353*a* Event entry data storage unit
36 Administrator authentication information storage unit
37 Member authentication information storage unit
38 Registration support screen storage unit
39 Service group data storage unit
4 Input unit
5 Image display unit
6 Communication unit
11 Communication network
12 Operating user terminal
13 Client terminal The invention claim is:

1. A member information management system, comprising a processor and a memory, the processor configured to: store data of a plurality of first stage groups that provide services having similarity; store data of a plurality of settable second stage groups belonging to a first stage group as a higher-level group in a protection area corresponding to each of the first stage groups, the data of each of the second stage groups including presentation data of a registration form for a second stage group and presentation data of contents for the second stage group; store data of a member belonging to the first stage group and belonging to the second stage group in the first stage group, registered from the registration form in a protection area corresponding to each of the first stage groups, the data of the member including specific data for specifying the second stage group to which the member belongs and unique information of the member; store administrator authentication information in an administrator protection area other than the protection areas corresponding to the first stage groups; and permit all of the plurality of first stage groups to browse predetermined data in the protection area corresponding to the first stage group when a login operation of an administrator is successfully authenticated by the administrator authentication information.

2. The member information management system according to claim 1, wherein the same member can be registered to belong to a plurality of second stage groups belonging to the same first stage group, and the same member can be registered to belong to the second stage groups of different first stage groups among the plurality of first stage groups.

3. The member information management system according to claim 1, wherein the data of the member has a member ID, member authentication information corresponding to the member ID is stored in a member authentication protection area other than the protection area corresponding to the first stage group and the administrator protection area, and when the member authentication information was successfully authenticated in a login operation of the member, the member is permitted to browse the contents for the second stage group to which the member having the member ID belongs.

4. The member information management system according to claim 2, wherein the data of the member has a member ID, member authentication information corresponding to the member ID is stored in a member authentication protection area other than the protection area corresponding to the first stage group and the administrator protection area, and when the member authentication information was successfully authenticated in a login operation of the member, the member is permitted to browse the contents for the second stage group to which the member having the member ID belongs.

5. The member information management system according to claim 3, wherein the same member ID and the same member authentication information for permitting to browse the contents for the second stage groups in the different first stage groups are stored in the member authentication protection area with respect to the same member registered to belong to the second stage groups in different first stage groups of the entire plurality of first stage groups.

6. The member information management system according to claim 4, wherein the same member ID and the same member authentication information for permitting to browse the contents for the second stage groups in the different first stage groups are stored in the member authentication protection area with respect to the same member registered to belong to the second stage groups in different first stage groups of the entire plurality of first stage groups.

7. The member information management system according to claim 1, wherein the same member can be registered to belong to second stage groups different from one second stage group belonging to the same first stage group, and when a member who has registered to the one second stage group additionally registers to the different second stage groups, necessary data of the member stored in advance is presented to the other second stage groups in a state of being reflected in necessary input items of the registration form.

8. The member information management system according to claim 2, wherein the same member can be registered to belong to second stage groups different from one second stage group belonging to the same first stage group, and when a member who has registered to the one second stage group additionally registers to the different second stage groups, necessary data of the member stored in advance is presented to the other second stage groups in a state of being reflected in necessary input items of the registration form.

9. The member information management system according to claim 3, wherein the same member can be registered to belong to second stage groups different from one second stage group belonging to the same first stage group, and when a member who has registered to the one second stage group additionally registers to the different second stage groups, necessary data of the member stored in advance is presented to the other second stage groups in a state of being reflected in necessary input items of the registration form.

10. The member information management system according to claim 4, wherein the same member can be registered to belong to second stage groups different from one second stage group belonging to the same first stage group, and when a member who has registered to the one second stage group additionally registers to the different second stage groups, necessary data of the member stored in advance is presented to the other second stage groups in a state of being reflected in necessary input items of the registration form.

11. The member information management system according to claim 1, wherein the same member can be registered to belong to the second stage group different from one second stage group belonging to the same first stage group, in response to a request by a member having registered to the one second stage group to additionally register to the different second stage group, the specific data for specifying the different second stage group is additionally stored in correlation with the necessary data of the member stored in advance, and in response to a request by a member having registered to the one second stage group to change the registration so as to be registered to the different second stage group, the specific data for specifying the one second stage group stored in correlation with the necessary data of the member stored in advance is changed to the specific data for specifying the other second stage group and is stored in correlation.

12. The member information management system according to claim 2, wherein the same member can be registered to belong to the second stage group different from one second stage group belonging to the same first stage group, in response to a request by a member having registered to the one second stage group to additionally register to the different second stage group, the specific data for specifying the different second stage group is additionally stored in correlation with the necessary data of the member stored in advance, and in response to a request by a member having registered to the one second stage group to change the registration so as to be registered to the different second stage group, the specific data for specifying the one second stage group stored in correlation with the necessary data of the member stored in advance is changed to the specific data for specifying the other second stage group and is stored in correlation.

13. The member information management system according to claim 3, wherein the same member can be registered to belong to the second stage group different from one second stage group belonging to the same first stage group, in response to a request by a member having registered to the one second stage group to additionally register to the different second stage group, the specific data for specifying the different second stage group is additionally stored in correlation with the necessary data of the member stored in advance, and in response to a request by a member having registered to the one second stage group to change the registration so as to be registered to the different second stage group, the specific data for specifying the one second stage group stored in correlation with the necessary data of the member stored in advance is changed to the specific data for specifying the other second stage group and is stored in correlation.

14. The member information management system according to claim 4, wherein the same member can be registered to belong to the second stage group different from one second stage group belonging to the same first stage group, in response to a request by a member having registered to the one second stage group to additionally register to the different second stage group, the specific data for specifying the different second stage group is additionally stored in correlation with the necessary data of the member stored in advance, and in response to a request by a member having registered to the one second stage group to change the registration so as to be registered to the different second stage group, the specific data for specifying the one second stage group stored in correlation with the necessary data of the member stored in advance is changed to the specific data for specifying the other second stage group and is stored in correlation.

15. The member information management system according to claim 1, wherein data of a service group is stored in the same layer as the plurality of first stage groups, and the data of the service group includes unique information of an operating user who operates each of the plurality of first stage groups and presentation data of service contents provided in common to the operating users.

16. The member information management system according to claim 2, wherein data of a service group is stored in the same layer as the plurality of first stage groups, and the data of the service group includes unique information of an operating user who operates each of the plurality of first stage groups and presentation data of service contents provided in common to the operating users.

17. The member information management system according to claim 3, wherein data of a service group is stored in the same layer as the plurality of first stage groups, and the data of the service group includes unique information of an operating user who operates each of the plurality of first stage groups and presentation data of service contents provided in common to the operating users.

18. The member information management system according to claim 4, wherein data of a service group is stored in the same layer as the plurality of first stage groups, and the data of the service group includes unique information of an operating user who operates each of the plurality of first stage groups and presentation data of service contents provided in common to the operating users.

19. A non-transitory computer readable medium storing a member information management program when executed by a processor causes a computer to function as means for:
  storing data of a plurality of first stage groups that provide services having similarity;
  storing data of a plurality of settable second stage groups belonging to a first stage group as a higher-level group in a protection area corresponding to each of the first stage groups, the data of each of the second stage groups including presentation data of a registration form for a second stage group and presentation data of contents for the second stage group;
  storing data of a member belonging to the first stage group and belonging to the second stage group in the first stage group, registered from the registration form in a protection area corresponding to each of the first stage groups, the data of the member including specific data for specifying the second stage group to which the member belongs and unique information of the member;
  storing administrator authentication information in an administrator protection area other than the protection areas corresponding to the first stage groups; and
  permitting all of the plurality of first stage groups to browse predetermined data in the protection area corresponding to the first stage group when a login operation of an administrator is successfully authenticated by the administrator authentication information.

* * * * *